United States Patent
Lutz et al.

(10) Patent No.: US 7,425,894 B2
(45) Date of Patent: Sep. 16, 2008

(54) SECURITY ELEMENT FOR RADIO FREQUENCY IDENTIFICATION

(75) Inventors: Norbert Lutz, Rückersdorf (DE); John Anthony Peters, Au (CH)

(73) Assignee: OVD Kinegram AG, Zug (CH)

( * ) Notice: Subject to any disclaimer, the term of this patent is extended or adjusted under 35 U.S.C. 154(b) by 108 days.

(21) Appl. No.: 10/564,758

(22) PCT Filed: Jul. 16, 2004

(86) PCT No.: PCT/EP2004/007970

§ 371 (c)(1),
(2), (4) Date: Jan. 13, 2006

(87) PCT Pub. No.: WO2005/010809

PCT Pub. Date: Feb. 3, 2005

(65) Prior Publication Data

US 2006/0164249 A1    Jul. 27, 2006

(30) Foreign Application Priority Data

Jul. 23, 2003    (DE) ................ 103 33 704

(51) Int. Cl.
G08B 13/14    (2006.01)
(52) U.S. Cl. ............... 340/572.1; 340/572.7; 343/806; 343/866
(58) Field of Classification Search ........... 340/572.7, 340/572.5, 572.1; 235/492; 343/748, 750, 343/806, 866
See application file for complete search history.

(56) References Cited

U.S. PATENT DOCUMENTS

| | | | |
|---|---|---|---|
| 4,220,956 A | 9/1980 | Sanford | |
| 5,528,222 A | 6/1996 | Moskowitz et al. | |
| 5,995,006 A * | 11/1999 | Walsh | 340/572.7 |
| 6,100,804 A * | 8/2000 | Brady et al. | 340/572.7 |
| 6,491,324 B1 | 12/2002 | Schmitz et al. | |
| 6,995,732 B2 * | 2/2006 | Goebel et al. | 343/866 |
| 7,093,345 B2 * | 8/2006 | Forster et al. | 343/806 |
| 7,190,319 B2 * | 3/2007 | Forster et al. | 343/806 |
| 2006/0125639 A1 * | 6/2006 | Jung et al. | 340/572.7 |

FOREIGN PATENT DOCUMENTS

| | | |
|---|---|---|
| DE | CH689690 A5 | 8/1999 |
| DE | 101 18 487 A1 | 10/2002 |
| EP | 1076315 | 2/2001 |
| FR | 2827842 A1 | 1/2003 |
| RU | 2074097 C1 | 2/1997 |
| RU | 2176092 C1 | 11/2001 |
| RU | 2193975 C2 | 12/2002 |
| WO | WO90/12694 A1 | 11/1990 |
| WO | WO 97/21184 | 6/1997 |
| WO | WO03034332 A1 | 4/2003 |

* cited by examiner

*Primary Examiner*—John A Tweel, Jr.
(74) *Attorney, Agent, or Firm*—Hoffman & Baron, LLP

(57) ABSTRACT

A security element for RF identification and a process for the production of such a security element. The security element has a flexible, electrically non-conducting substrate layer and a conductive layer of an electrically conducting material which is applied to the substrate layer and which in a first surface region of the substrate layer is shaped out in pattern form to form an RF component. A first relief structure is shaped at least in region-wise manner in the surface region, associated with the RF component, in the first conductive layer.

18 Claims, 8 Drawing Sheets

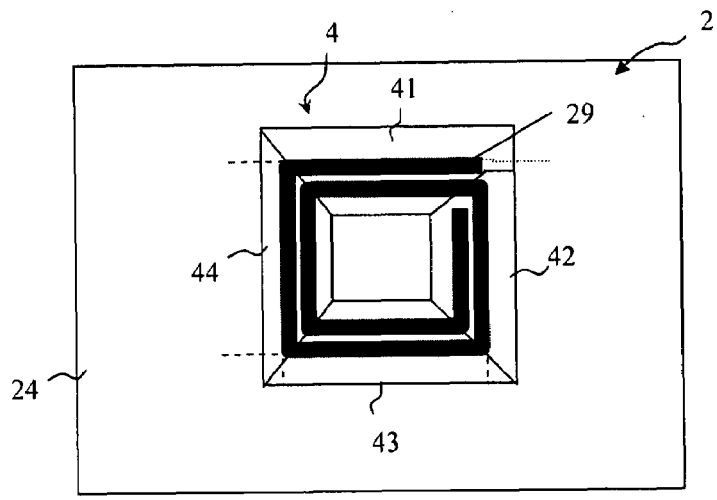
Fig. 2 b
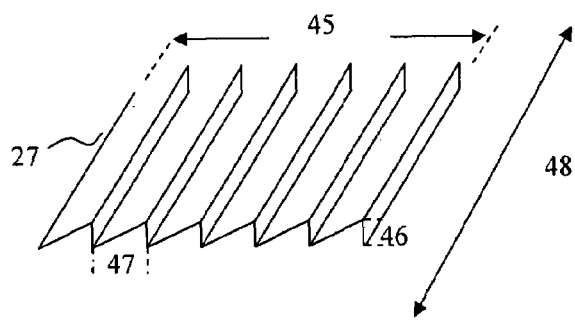
Fig. 2 c
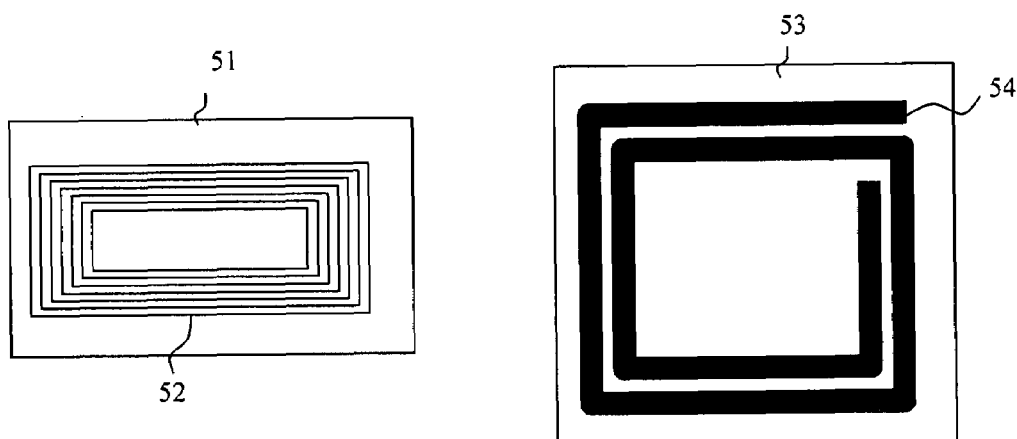
Fig. 3
Fig. 4

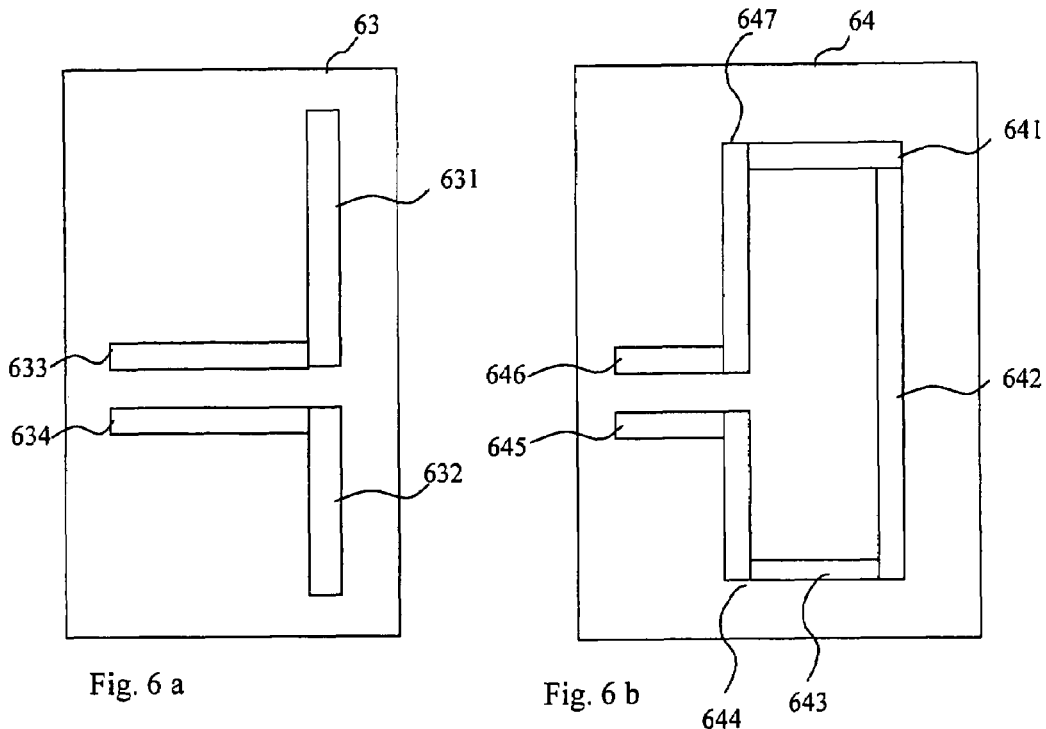
Fig. 6 a
Fig. 6 b
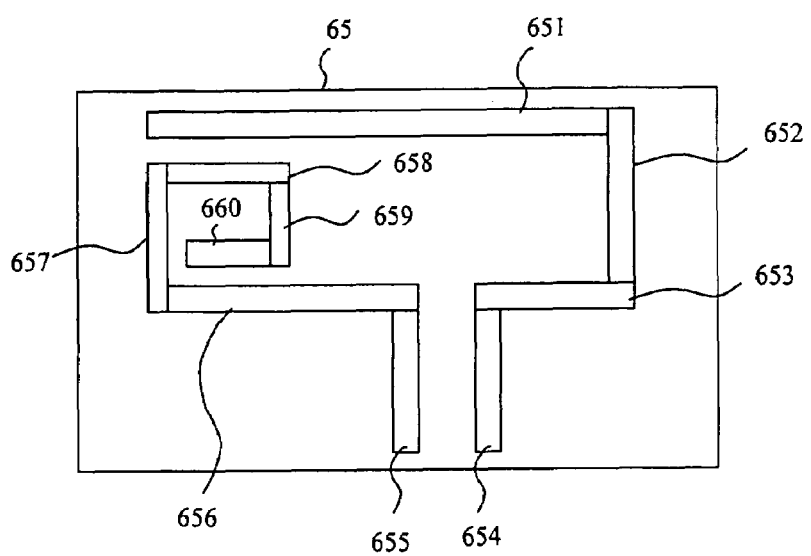
Fig. 6 c

SECURITY ELEMENT FOR RADIO FREQUENCY IDENTIFICATION

CROSS-REFERENCE TO RELATED APPLICATIONS

This application is a National Phase application of International Application No. PCT/EP2004/007970 filed Jul. 16, 2004, which claims priority based on German Patent Application No. 10333704.0 filed Jul. 23, 2003, which are both incorporated herein by reference.

FIELD OF THE INVENTION

The invention concerns a security element for RF identification, which has a flexible, electrically non-conducting substrate layer and a first conductive layer of an electrically conducting material which is applied to the substrate layer and which in a first surface region of the substrate layer is shaped out in pattern form to form an RF component. The invention further concerns a process for the production of such a security element.

BRIEF DESCRIPTION OF THE RELATED ART

U.S. Pat. No. 4,220,956 describes an RF identification circuit (RF=radio frequency) having a series of antennae which are produced from a copper laminate by means of an etching process. The copper laminate is applied to a dielectric. As the dielectric does not afford any electrical functions it can be shaped out to be very thin, whereby the mechanical flexibility of the RF identification circuit is increased.

U.S. Pat. No. 5,528,222 describes an RF identification circuit which reflects an RF carrier emitted from a base station back to the base station and in so doing modulates additional information on to the reflected signal, in accordance with a preprogrammed information protocol. The RF identification circuit has a semiconductor circuit with a memory and one or more RF components of an RF circuit. The semiconductor circuit is mounted on a substrate. The RF signal received by the antenna is passed to the semiconductor circuit. The substrate is a flexible, non-conducting substrate. The antenna is an integral constituent part of the substrate. It comprises a 25 to 35 µm thick copper track applied to a polyester or polyamide layer.

SUMMARY OF THE INVENTION

By virtue of that structure the RF identification circuit is of a very thin and mechanically flexible form so that it is highly suitable as a security element for credit cards and passes.

The object of the present invention is now to provide an improved security element for RF identification.

That object is attained by a security element for RF identification, which has a flexible, electrically non-conducting substrate layer and a first conductive layer of an electrically conducting material which is applied to the substrate layer and which in a first surface region of the substrate layer is shaped out in pattern form to form an RF component and in which a first relief structure is shaped at least in region-wise manner in the surface region, associated with the RF component, of the first conductive layer. The invention is further attained by a process for the production of a security element for RF identification, in which a first conductive layer of an electrically conducting material shaped out in pattern form to form an RF component is applied to a flexible, electrically conducting substrate layer in a first surface region of the substrate layer and in which a first relief structure for altering electrical properties of the RF component is shaped at least in region-wise manner in the surface region associated with the RF component in the first conductive layer.

The invention affords the advantage that the mechanical flexibility of security elements for RF identification can be further enhanced and production costs can be lowered. Thus it is possible by means of the invention on the one hand to reduce the thickness of the electrically conductive layer and at the same time to keep the quality of the RF components of the security element constant. Conversely it is possible to improve the quality of the RF components and thus the electrical properties of the security element with constant dimensions and thickness of the RF components.

The term RF identification (RF–ID=radio frequency identification) is generally used to denote a contactless RF communication between a transponder which is associated with an article or a person and a reading device. In that case the transponder has for example an antenna which is part of a resonance circuit and/or is connected to a semiconductor chip. The term RF components is used to denote components for processing RF signals, for example antennae, coils or capacitors.

Advantageous configurations of the invention are set forth in the appendant claims.

In accordance with a preferred embodiment of the invention, the conductive layer is shaped in the first surface region, in the form of an RF antenna or coil, wherein in the region of the conductive layer which is associated with the RF antenna or coil, the grooves of the relief structure are oriented on average more lengthwise relative to the direction of flow of the electric current than transversely with respect to the direction of flow of the electric current. That improves the quality factor Q which is defined by $$Q = R \cdot \left(\frac{C}{L}\right)^{1/2}$$

with R=ohmic resistance of the circuit, C=capacitance and L=total inductance of the antenna. A relief structure of that kind on the one hand increases the effective width of the conductor tracks forming the RF antenna or coil whereby the resistance of the conductor tracks is reduced with a constant thickness for the conductive layer, while on the other hand the increase in the surface area of the conductive layer, which is achieved in that way, in the region of the RF antenna or coil, has an action on the skin effect, thereby affording a further reduction in the effective resistance of the RF antenna or coil. In that way it is then possible for the electrically conductive layer to be shaped out thinner and in that case to keep the quality of the antenna or coil constant. That reduces the production costs and it is also possible to produce security elements with a high level of mechanical flexibility. Alternatively it is possible to keep the thickness of the electrically conductive layer constant and to reduce the width of the conductor tracks forming the RF antenna or coil, whereby the packaging density can be increased.

In that respect it is particularly advantageous for the grooves of the relief structure in the region of the conductive layer which is associated with the RF antenna or coil to be oriented lengthwise of the direction of flow of the electric current. That achieves a particularly great reduction in ohmic resistance.

Desirably in that case the first electrically conductive layer in the first region is shaped out in the form of one or more conductor tracks of a width of 5 μm to 10 mm, preferably in the region of 100 μm.

In accordance with a further preferred embodiment of the invention the security element has a second electrically conductive layer, wherein the first and the second electrically conductive layers form a capacitive element in the first surface region. The surface area of the electrically conductive layer in the first surface region is now increased here by the relief structure, thereby increasing the charge density in the first surface region. That then also increases the capacitance of the capacitive element which is provided in the first surface region. That effect can be used to reduce the surface region provided for the capacitive element or to implement fine tuning of the resonance frequency of an oscillator circuit by means of the relief structure. In that way it is possible to increase the packaging density of the security element, reduce production costs and improve the electrical properties of the security element.

It is particularly advantageous here to provide a first relief structure in the region of the capacitive element, that first relief structure being formed by a relief structure with a plurality of mutually crossing grooves. In that way it is possible to achieve a particularly high fractal component and thus a particularly high level of charge density. That can also be achieved if a second relief structure is shaped at least in region-wise manner in the surface region associated with the capacitive element in the second conductive layer.

It has been found that the use of relief structures with a profile depth in the range of 50 nm to 10 μm and a spatial frequency of 100 to 2000 lines per mm are particularly suitable. It has further been found advantageous for the first electrically conductive layer to be of a thickness of 50 nm to 50 μm, preferably about 500 nm. With such a combination of relief depth, spatial frequency and layer thickness of the electrically conductive layer the above-indicated advantages achieved by the invention are particularly high.

It has further proven to be desirable for the first electrically conductive layer to be applied to the substrate layer by means of vapour deposition of a partial layer. In that case the metal layer can already be partially vapour-deposited in pattern form by the use of vapour deposition masks to form the RF component in the first surface region. It is also possible for firstly vapour deposition over the full surface area to be effected and then for the first surface region to be demetallised partially in pattern form to form the RF component. That affords advantages in terms of production engineering in manufacture of the first conductive layer, in particular in the above-discussed layer thickness range.

It is desirable if the substrate layer has a replication layer and the first relief structure is shaped into the surface of the replication layer, which is towards the first conductive layer. In that way the relief structure is shaped both in the surface of the replication layer and also in the first conductive layer so that the substrate layer supports the relief shape of the first conductive layer.

Preferably a sawtooth-shaped relief structure, for example a blaze grating, is to be used as the relief structure. A profile shape of that kind represents a successful compromise between a high fractal component (effective width to projected width) and the possibility of achieving a first conductive layer of constant thickness by usual and tried-and-tested coating processes. In addition the use of relief structures has proven to be advantageous, which are formed from the superimposition of a coarse structure and a fine structure.

In accordance with a further preferred embodiment of the invention the relief structure serves not only to improve the electrical properties of RF components but additionally serves to produce optical security features. The relief structure thus has for example diffractive regions which, with incident light, produce optical-diffraction effects which serve as a further security feature.

It is further particularly advantageous if the security element represents a film element, in particular a stamping film, a laminating film, a sticker film or a partial element of a transfer layer portion of such a film. The security element can be particularly inexpensively produced in that way. There are also great advantages in regard to later use: the optical security element can thus be applied for example in a particularly inexpensive manner to security documents such as travel passes, driving licences, entry cards, credit cards, travel cards for transport systems or software licences. That equally applies for the application of the security element to products, for example for safeguarding articles, for tracking articles or for article authentication. It is also possible for the security element to be of a particularly thin and flexible nature.

Desirably the security element has a resonator circuit for RF identification and/or a chip. When it is in the form of a film element it is also possible in that respect to implement the chip into the film element or to implement the electrical logic of the chip into one or more layers of the film element. Tunability of the security element is further increased by virtue of the fact that two or more capacitive partial elements connected to connecting tracks are shaped out in the first conductive layer of an electrically conducting material. In fine tuning of the resonance frequency of the security element, one or more of those connecting tracks to capacitive partial elements are then severed for example by means of a laser beam. In that way the security element can be tuned for example in an individualisation or personalisation step to an individual resonance frequency, so that flexible use is made possible and production costs are reduced.

BRIEF DESCRIPTION OF THE DRAWINGS

The invention is described by way of example hereinafter by means of a number of embodiments with reference to the accompanying drawings in which:

FIG. 1a shows a security element 1 for RF identification, which is formed by a substrate layer 11 and a layer of an electrically conductive material which is applied to the top side and the underside of the substrate layer 11.

DETAILED DESCRIPTION OF THE PREFERRED EMBODIMENTS

The substrate layer 11 is formed by a thin elastic plastic material, for example of a thickness of 20 μm. The conductive layer applied to the top side of the substrate layer 11 is shaped out in pattern form so that it forms an RF antenna coil 12 and a plate of a capacitive element 13. The conductive layer applied to the underside of the substrate layer is also shaped out in pattern form to form an RF component and also forms in the region of the plate 13 a plate which together with the plate 13 forms the capacitive element.

Figure 1A:
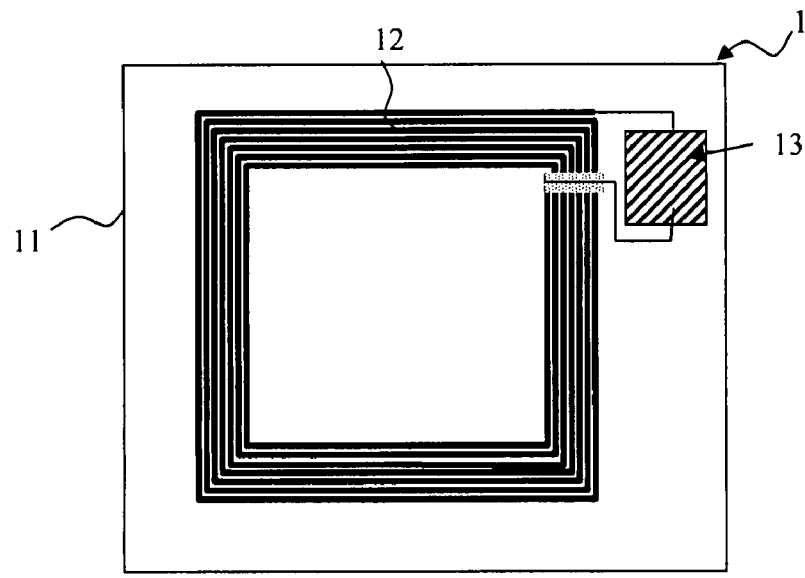
FIG. 1a is a diagrammatic view of a security element according to the invention for RF identification.

The layers of an electrically conductive material are 50 nm to 50 μm in thickness. The pattern-form shape of the conductive layer, as shown in FIG. 1a, is produced by an etching process from a metal layer covering the full surface area, by the application of a conductive paste or a thin metal wire. In addition, in the region of the RF antenna coil, a relief structure for altering the electrical parameters of that RF component is shaped into the conductive layer applied to the surface of the substrate layer 11.

Thus the relief structure is for example shaped in a metal wire fixed on a planar substrate layer. In that respect the packaging density which can be achieved is increased by virtue of the fact that a relief structure is shaped not only in the top side and the underside of the wire (in relation to the substrate layer) but a relief structure is also shaped in the side surfaces of the wire. In that case the relief structures of adjacent wire tracks preferably have mutually interengaging relief structure forms, for example rectangular, sine or triangular structures which are phase-displaced relative to each other by half a period.

Figure 1B:
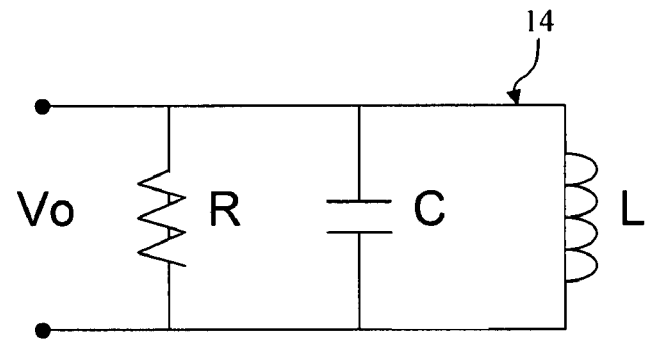
FIG. 1b shows an equivalent circuit diagram of the security element of FIG. 1a, FIG. 1c shows a functional diagram to illustrate the mode of operation of the security element of FIG. 1a, FIG. 2a is a diagrammatic view of a security element according to the invention for RF identification.

The pattern-shaped configuration of the conductive layers forms a parallel resonance circuit, the equivalent circuit diagram of which is shown in FIG. 1b:

FIG. 1b shows an electrical circuit 14 formed from the parallel connection of a resistance R, a capacitance C and an inductance L. A voltage is induced in the RF antenna coil 12 by the RF signals which are emitted by a reading device so that an output voltage $V_0$ is applied to the circuit.

Figure 1C:
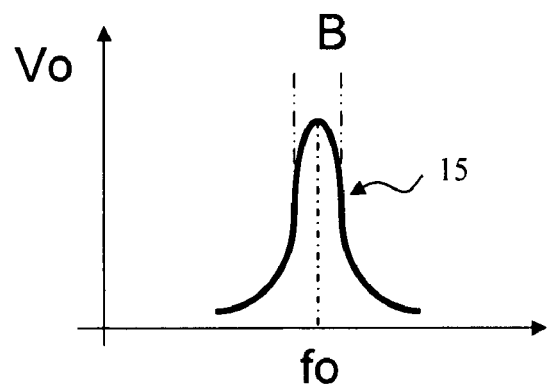

FIG. 1c now shows a view of a function 15 which describes the output voltage $V_0$ in dependence on the frequency of the RF signal emitted by the reading device.

At the resonance frequency $f_0$, with $$f_0 = \frac{1}{2\pi\sqrt{LC}}$$

the band width B of the circuit of FIG. 1b is:

$$B = \frac{1}{2\pi \cdot R \cdot C}$$

Accordingly the quality factor is $$Q = \frac{f_0}{B} = R \cdot \sqrt{\frac{C}{L}}$$

Finally that gives the following relationship for the voltage $V_0$ and thus for the induced signal strength:

$$V_0 = 2\pi \cdot f_0 \cdot N \cdot Q \cdot S \cdot B_0 \cdot \cos \alpha,$$

wherein $f_0$ is the resonance frequency, N is the number of turns of the RF antenna coil 12, S is the area enclosed by the RF antenna coil 12, $B_0$ is the strength of the signal received by the RF reading device and α is the angle between the propagation vector of the received signal and the plane defined by the RF antenna coil 12.

The band width of the resonator should be at least twice as great as the data rate of the reading device. If now it is assumed that there is a typical data rate of 70 KHz, a band width of 150 Hz and a carrier frequency of 13.56 MHz, the maximum quality factor Qmax=13.56 MHz/150 KHz=96.86.

The higher the quality factor, the greater is the induced signal and thus the reading distance between the reading device and the security element 1, but then the correspondingly less are the band width and therewith the usable data rate. The best result is now afforded by a transponder if the quality factor of the antenna circuit is in a given range which is dependent on the carrier frequency and the data rate.

For the above-described embodiment with a carrier frequency of 13.56 MHz and a data rate of 70 KHz a quality factor in the range of 40 to 60 has proven to be the best compromise between the induced signal strength and the band width. That practical ascertained factor differs from the above-ascertained maximum quality factor Qmax as, due to wrong tolerances in respect of the capacitive and inductive components and mismatchings of the chip, the band width is to be selected to be somewhat higher than the theoretically ascertained value.

As already indicated above the quality factor Q depends on the resistance R, the capacitance C and the inductance L. The capacitance C and the inductance L are predetermined by the carrier frequency which is used by the reading device and which corresponds to the resonance frequency. To set an optimum quality factor therefore it is essentially the influence of the resistance R that remains. Now, the invention introduces an additional parameter by means of which the resistance R can be influenced and thus the transponder can be set to an optimum operating condition: the resistance R is now not only dependent on the thickness of the electrically conductive layer and the configuration of the electrically conductive layer, but it is further dependent on the relief shape, relief depth and spatial frequency of the relief structure shaped in the electrically conductive layer.

The layer thickness of the electrically conductive layer is generally predetermined by the manufacturing technology involved and in that way cannot usually be altered for fine tuning of the quality factor. The way in which the electrically conductive layer is shaped out further also influences the signal strength: thus for example the width of the conductor tracks forming the antenna coil cannot be varied just as desired as the width of the conductor tracks further also influences the area enclosed by the coil, that is to say, with the same available area, the signal strength is correspondingly lower, the wider the conductor tracks of the coil are (see the foregoing formula).

Accordingly the configuration of the relief structure provides on the one hand that it is possible to achieve precise fine setting of the resistance R and thus a quality factor which is optimum for the respective transponder. If the grooves of the relief structure in the region of the RF antenna coil 12 are also oriented on average more lengthwise in relation to the direction of flow of the electric current than transversely with respect to the direction of flow of the electric current, there is a reduction in the resistance R, with a constant thickness for the conductive layer, so that the signal strength is improved with a constant available area for the RF antenna coil and a constant thickness of the electrically conductive layer (see the foregoing formula).

The structure of a security element according to the invention will now be described in detail with reference to FIG. 2a, FIG. 2b and FIG. 2c.

Figure 2:
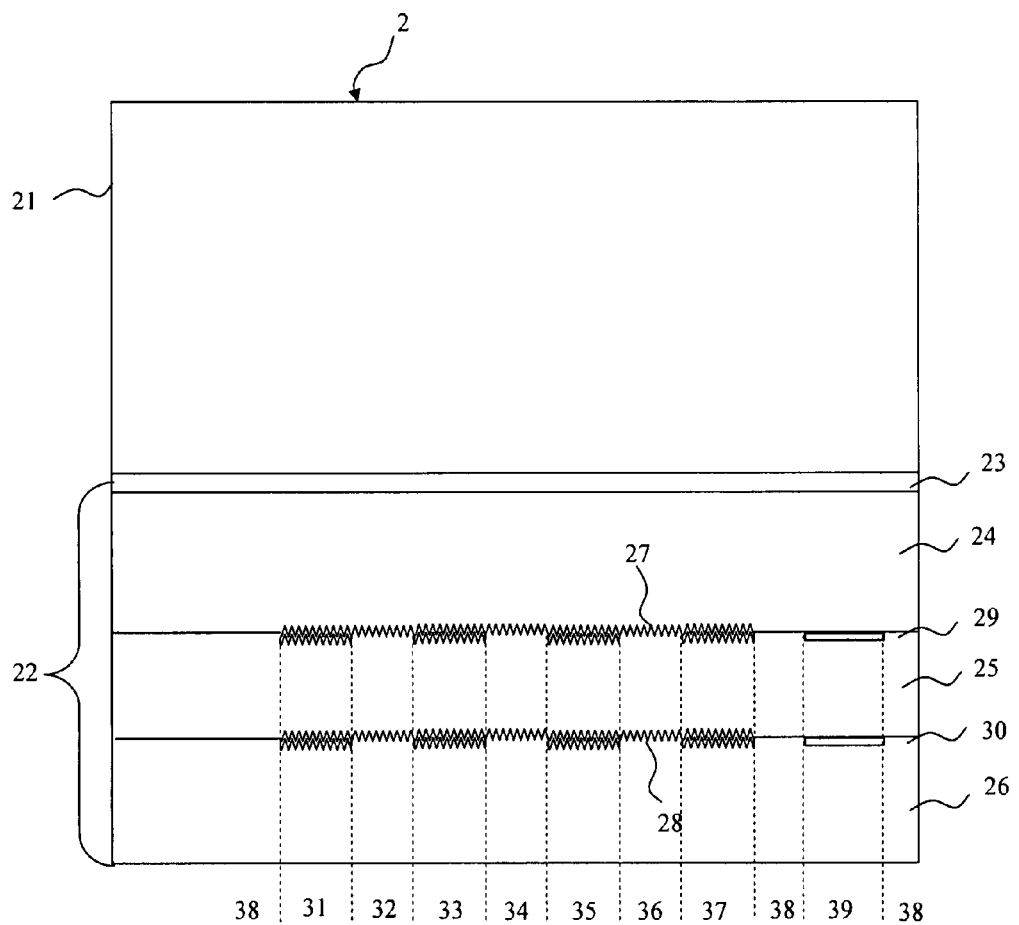
FIGS. 2b and 2c are diagrammatic views of partial regions of the security element of FIG. 2a, FIGS. 3 to 5 are diagrammatic views to show alternative embodiments of the security element of FIG. 2a, FIGS. 6a to 6c are diagrammatic views of surface regions of security elements according to the invention.

FIG. 2a shows a security element for RF identification, which is formed by a film element 2. The film element 2 is a stamping film. It is however also possible that the film element 2 is a transfer, sticker or laminating film or that a security element according to the invention is formed by the transfer layer portion of a stamping, transfer or laminating film. The film element 2 has a carrier film 21 and a transfer layer portion 22. The transfer layer portion 22 has a release and/or protective lacquer layer 23, two replication layers 24 and 25, two electrically conducting layers 29 and 30 and an adhesive layer 26. The carrier layer 21 comprises for example a polyester film of a thickness of 12 µm to 50 µm. The release and/or protective lacquer layer 23 is applied in a layer thickness of 0.3 to 1.2 µm to the carrier film. The replication layers 24 and 25 are of a layer thickness of 20 µm or less.

The replication layer 24 preferably involves a transparent thermoplastic material which is applied for example by means of a printing process to the film body formed by the carrier film 21 and the protective lacquer and/or release layer 24. After drying, a relief structure 27 is replicated into the replication layer 24 by means of a stamping tool, in the regions 31 to 37. It is however also possible here for the replication operation to be carried out by means of a UV replication process in which a UV replication lacquer is applied to the film body formed by the carrier film 21 and the release and/or protective lacquer layer 23 and then partially irradiated with UV light for replication of the relief structure 27. After replication of the relief structure 27 the replication lacquer hardens by cross-linking or in some other fashion. The thin, electrically conducting layer 29 is now applied to the replication layer 24 over the full surface area involved, in a layer thickness of 50 nm to 50 µm, preferably 1 µm to 10 µm, for example by vapour deposition or by sputtering or printing. In that case the electrically conductive layer preferably comprises a metal layer, for example of copper, aluminium, gold, silver or brass. The conductive layer can also comprise an alloy of the above-mentioned materials or another conductive material, for example a conductive polymer.

The electrically conductive layer is then partially demetallised in the regions 38, 32, 34 and 36 so that for example the conductor track configuration shown in FIG. 2b is afforded in the regions 31 to 37. In that case demetallisation can be effected by printing on an etching resist and then etching, by printing on an etching agent or by printing on a washing mask prior to coating and a washing operation after coating. It will be appreciated that it is also possible for the vapour deposition operation to be already effected partially and in pattern form in the configuration shown in FIGS. 2a and 2b, by suitably shaped vapour deposition masks. Further processes are the exposure of photoresist with following etching or laser ablation.

The replication layer 25 is then applied, in which a relief structure 28 is then replicated, as already described hereinbefore in relation to the layers 24 and 29, and then the electrically conductive layer is applied in partial and pattern-shaped form, as shown in FIG. 2a. The adhesive layer 26 is then applied. The adhesive layer 26 is for example a thermally activatable adhesive.

It would also be possible here to dispense with the replication layer 25 and the electrically conductive layer 30. It will be appreciated that it is also possible for the film body 2 to have still further layers which for example afford optically perceptible security features. Thus the film body can also have for example a thin film layer system for producing viewing angle-dependent colour shifts, by means of interference.

FIG. 2b now shows a portion of the film element 2 with a surface region 4. The electrically conductive layer 29 is shaped out in the surface region 4, in the form of a planar coil with two turns, as shown in FIG. 2b.

The coil is here for example of the following dimensions: the length of the coil is 8 cm, the width of the coil is 5 cm, the width of the turns is 2 mm, the spacing between the turns is 2 mm and the thickness of the electrically conductive layer, depending on the respective choice of the relief structure 27, is between 50 nm and 10 µm.

In order now to achieve a quality factor Q of 50, a coil resistance R is to be selected, for which the following applies:

$$R = 50 \cdot \sqrt{\frac{L}{C}}$$

Accordingly a thickness te of the electrically conductive layer 29 is to be selected, in respect of which the following condition applies:

$$te = \frac{\rho \cdot l}{w \cdot F \cdot 50 \sqrt{\frac{C}{L}}}$$

wherein ρ is the specific resistance, I is the total length of the conductor track of the coil, and F is the fractal factor. The fractal factor F is the ratio of the effective width to the projected width of the conductor tracks of the coil.

The skin effect which changes the resistance at high frequencies is also to be considered here. In this respect the skin depth Ds is determined by the following formula:

$$Ds = \frac{1}{\sqrt{\pi \cdot f_0 \cdot \mu \cdot \sigma}}$$

wherein µ is the permeability of the material and σ is electrical conductivity.

At carrier frequencies in the region of 13.56 MHz and with a thickness for the electrically conductive layer which is markedly less than 20 µm, the skin effect is negligible. At higher frequencies, for example in the 895 MHz or 2.45 GHz band in contrast the skin effect also has an action even with layer thicknesses in respect of the electrically conductive layer in the range of 1 µm to 50 nm. The resistance of the coil is reduced by virtue of the skin effect with the increase in surface area which is achieved by the relief structure 27.

The surface region 4 has four partial regions 41 to 44 in each of which the orientation of the relief structure 27 is respectively different. Thus the grooves of the relief structure 27 are oriented horizontally in the partial regions 41 and 43 and perpendicularly in the partial regions 44 and 42. That provides that the grooves of the relief structure 27 are oriented very substantially lengthwise of the direction of flow of the electric current.

The relief structure shown in FIG. 2c is used as the profile shape for the relief structure 27.

FIG. 2c shows a portion of a conductor track of the coil, which is of a width 45 and in which the relief structure 27 is shaped. In this case the relief structure 27 has a grating period 47 and a profile depth 46. The fractal factor F now results from the ratio of the effective width which is determined by the grating period 47 and the relief depth 46 and the projected width, that is to say the width 45. For a sawtooth profile the fractal factor is calculated as follows:

$$F = h/d + \sqrt{\frac{h^2 + d^2}{d}}$$

wherein h=the height and d=the period.

Therefore, for the sawtooth-shaped relief structure shown in FIG. 2c, with a profile depth of 1 μm there is a fractal factor of 1.62 with a grating period of 2 μm, a fractal factor of 2.41 with a grating period of 1 μm and a fractal factor of 4.24 with a grating period of 0.5 μm.

In order now to achieve a quality factor of 100 in the above-described coil, the layer thickness of the electrically conductive layer without relief structure is to be selected at a value of 1.43 μm, when using a relief structure with a fractal factor of 1.62 it is to be selected at a thickness of 0.88 μm, with a fractal factor of 2.41 it is to be selected at a thickness of 0.59 μm and with a fractal factor of 4.24 it is to be selected at a value of 0.32 μm. As can be seen therefrom therefore the quality factor and the layer thickness to be selected for the electrically conductive layer 27 are quite substantially influenced by the relief structure 27.

FIGS. 3 and 4 now show further possible ways of positioning and shaping out a relief structure 27 in the surface region 4.

FIG. 3 shows a surface region 51 and a relief structure 52. As indicated in FIG. 3 the grooves of the relief structure 52 are arranged in the form of concentric rectangles. Now, the conductor tracks of the coil are provided in the region in which the relief structure 52 is shaped so that the relief structure 52 is provided not only in the region of the conductor tracks but also in the intermediate spaces therebetween. That has the advantage that the relief structure 52 can be used for different RF components, for example for coils with a different number of turns.

FIG. 4 now shows a surface region 53 having a partial region 54 in which a relief structure is shaped. In this case the electrically conductive layer is also provided only in the partial regions 54 so that the relief structure 'goes over' the regions in which the electrically conductive layer is present. In this case, the grooves of the relief structure in the partial region 54 are respectively oriented in the direction of flow of the electric current and thus are always oriented in the longitudinal direction of the conductor tracks forming the coil.

It will be appreciated that any other relief structures can be used as the relief structure, besides that shown in FIG. 2c. Thus for example it is possible to use relief structures with sinusoidal, rectangular or triangular profile shapes. The spatial frequency and the profile depth can also be varied. As already indicated above in that respect in particular spatial frequencies of between 100 and 2000 lines per mm are particularly well suitable as that provides for a strong influence in respect of the fractal factor. In that case the profile depth is preferably selected from the range of 50 nm to 10 μm.

In addition it is also possible that, besides the above-indicated electrical action, the relief structure 27 also produces an optical effect which can be used for example as an additional security feature of the security element 2. Thus it is for example possible to deliberately design structures which have an optical-diffraction effect such as for example holograms, diffraction gratings, kineforms and the like, which on the one hand exhibit the above-described electrical effect and also exhibit an optical action as an additional optical security feature.

Figure 5:
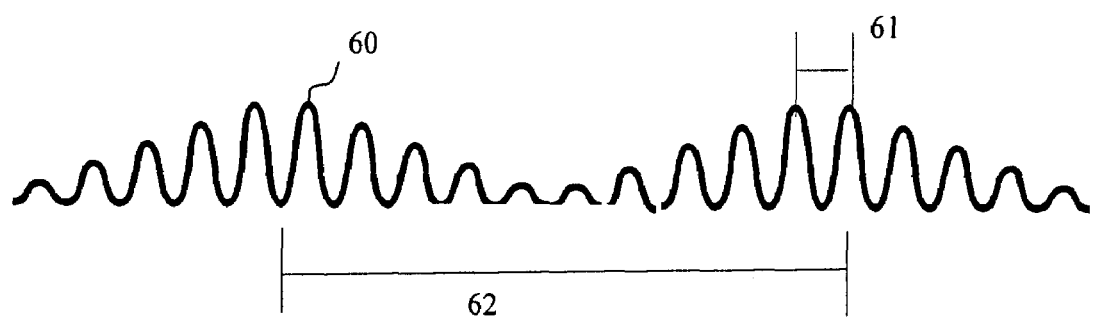

Thus for example FIG. 5 shows a relief shape 60 which is provided by a superimposition of a coarse structure with a period 62 and a fine structure with a period 61. The fine structure can be used here for example primarily to produce the above-described electrical effects whereas the coarse structure serves primarily for producing a given optical security feature. By virtue of such a combination of coarse structure and fine structure it is then possible for the optimum surface configuration to be selected for the production of the electrical effect, to be decoupled from the optical surface configuration necessary for achieving the optical security feature.

There is also the reverse possibility, that is to say the coarse structure serves primarily for producing the optical effect and the fine structure serves primarily for producing the electrical effect.

FIGS. 6a to 6c show surface regions 63, 64 and 65 in which an electrically conductive layer is respectively shaped to form an RF antenna.

The surface region 63 has partial surfaces 631 to 634, in each of which an electrically conductive layer is applied on a relief structure. That relief structure is oriented in the perpendicular direction in the partial regions 631 and 632 and in the horizontal direction in the partial regions 633 and 634.

The surface region 64 has partial surfaces 641 to 647, in each of which an electrically conductive layer is applied on a relief structure. In this case the relief structure is oriented perpendicularly in the partial regions 642, 644 and 647 and horizontally in the partial regions 641, 643, 645 and 646.

The surface region 65 has an electrically conductive layer applied on a relief structure, in partial regions 651 to 660. The relief structure is oriented perpendicularly in the partial regions 652, 654, 655, 657 and 659 and horizontally in the partial regions 651, 653, 656, 658 and 660.

In regard to the other shaping of the relief structures attention is directed to FIG. 2c, FIG. 3 and FIG. 4.

Figure 7A:
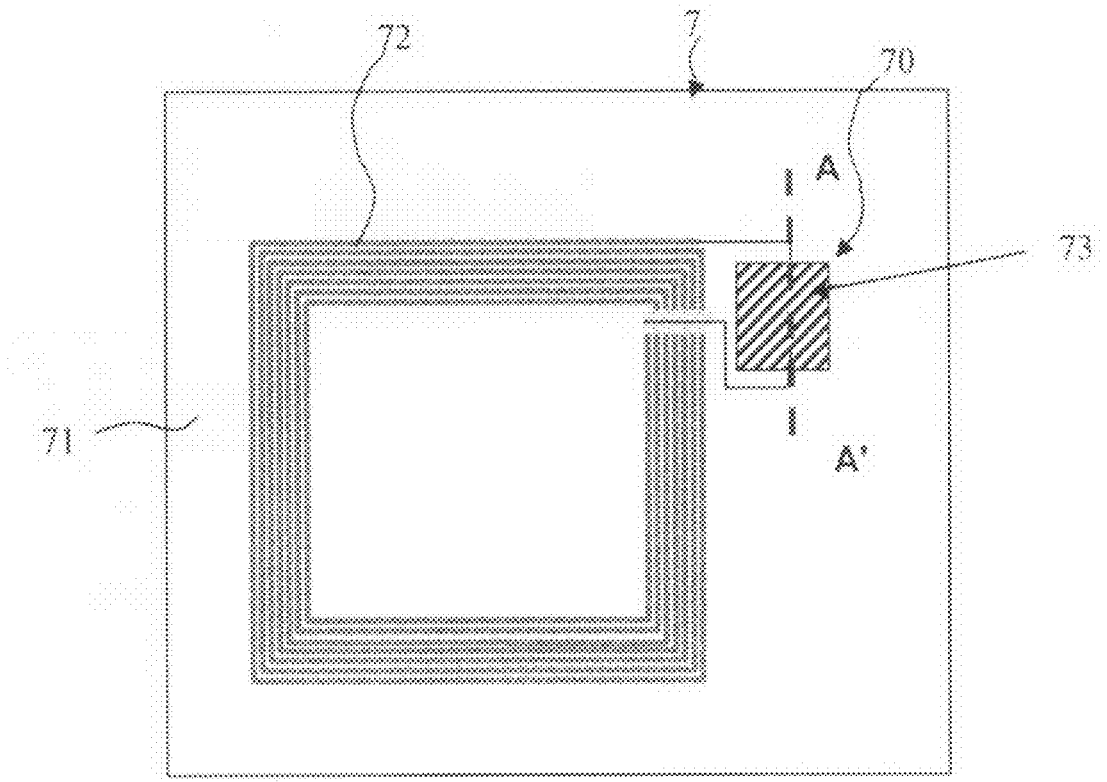
FIGS. 7a and 7b are diagrammatic views of a further security element according to the invention for RF identification.

FIG. 7a shows a security element 7 having a substrate layer 71, an RF antenna coil 72 and a capacitive element 70.

The RF antenna coil 72 is of a configuration like the RF antenna coil 12 shown in FIG. 1a or the coil in the surface region 4 shown in FIGS. 2b and 2c. The precise structure of the capacitive element 70 is shown in FIG. 7b.

Figure 7B:
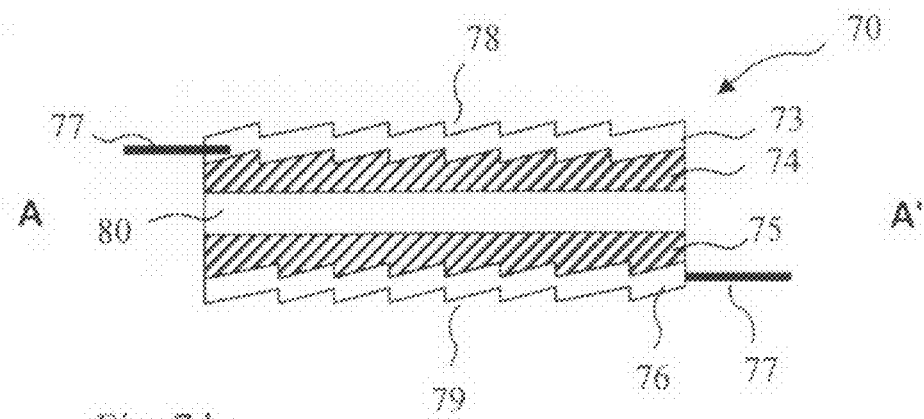

FIG. 7b shows a section through the capacitive element 70 and shows two electrically conductive layers 73 and 76, two replication layers 74 and 75 and a carrier layer 80. The electrically conductive layers 73 and 76 as well as the replication layers 74 and 75 are of a configuration like the electrically conductive layers 29 and 30 and the replication layers 24 and 25 of FIG. 2a. The carrier layer 80 is for example a polyester film or a bonding layer. It would however also be possible to dispense with the layer 80. The capacitance 70 is further connected to the RF antenna coil 72 by way of connecting elements 77. As shown in FIG. 7b a relief structure 78 and 79 respectively is shaped in the electrically conductive layers 73 and 76.

The capacitance C of the capacitive element 70 is determined as $$C = \frac{\kappa \varepsilon_0 A}{d_s},$$

wherein κ is the dielectric constant, $\varepsilon_0$ is the permeability constant, A is the surface area of the capacitor plates and $d_s$ is the distance between the capacitor plates. In this embodiment κ is 2.1 to 2.3, $\varepsilon_0$ is approximately $8.9 \cdot 10^{-12}$ coul$^2$/N–m$^2$ and $d_s$ is approximately 20 μm.

In this case also the relief structures 78 and 79 afford the affect of increasing the effective surface area, as discussed with reference to FIG. 2c, so that in this case also, in the foregoing formula, the surface area A is to be multiplied by the fractal factor. If, as shown in FIG. 7, a relief structure is shaped in the electrically conductive layer on both sides, then the surface area A is to be multiplied by the fractal factors of both relief structures. If the relief structures 78 and 79 have for example a relief depth of 1 μm and a grating period of 1 μm, then the surface area is to be multiplied by the fractal factor 2.41×2.41=5.81.

In that way it is possible for the surface area requirement of the capacitive element to be considerably reduced by means of the relief structures 78 and 79, or it is possible for the capacitance of the capacitive element to be adjusted for tuning of the resonance frequency by means of a specific configuration of the relief structures 78 and 79, with a predetermined surface area:

$$\left( f_0 = \frac{1}{2\pi\sqrt{LC}} \right).$$

In this case also, as already described above, there is the possibility that the relief structures 78 and 79 not only serve to influence the electrical properties of the capacitive element 70 but also produce optical effects which are used as an optical security element.

Figure 8A:
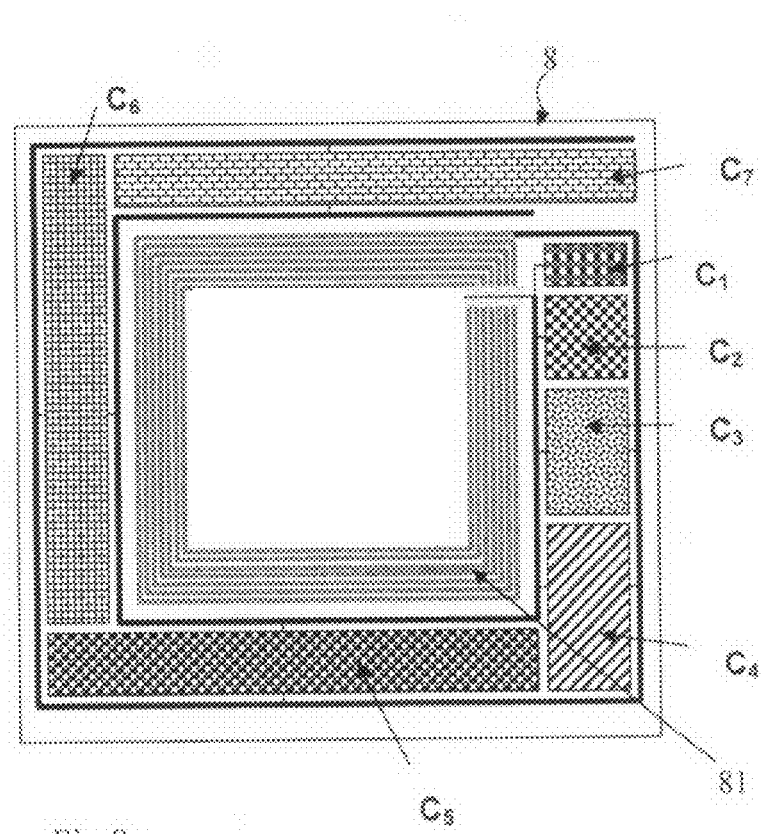
FIG. 8a is a diagrammatic view of a further security element according to the invention for RF identification.

FIG. 8a now shows a further embodiment of the invention in which the processes illustrated with reference to FIGS. 1a and 7a are combined with a configuration of the capacitive element, in which the capacitive element is formed from a plurality of capacitive partial elements connected by way of connecting tracks. Thus FIG. 8a shows a security element 8 having an RF antenna coil 81, a plurality of capacitors $C_1$ to $C_7$ and a plurality of connecting tracks which connect the RF antenna coil 81 to the capacitors $C_1$ to $C_6$. By targetedly severing the connecting tracks it is later possible to alter the capacitance of the capacitive element afterwards and thus alter the resonance frequency of the RF resonator circuit.

Figure 8B:
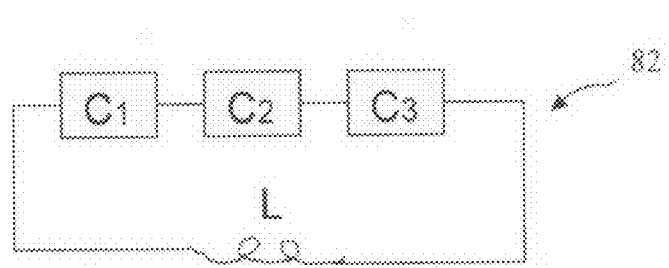
FIGS. 8b and 8c show equivalent circuit diagrams of RF components of the security element of FIG. 8a, and FIGS. 9a to 9d are diagrammatic views of further security elements according to the invention for RF identification.
Figure 8C:
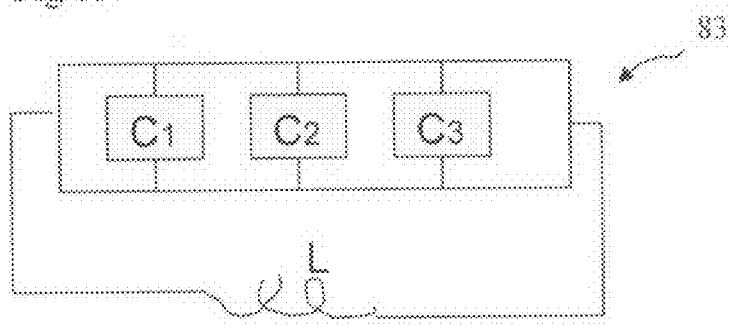

Thus it is for example possible, as shown in FIG. 8b, for the capacitors $C_1$ to $C_3$ to be connected in a series circuit with the inductance L formed by the RF antenna coil 81 by targetedly severing connecting tracks, thereby producing a resonator circuit 82. In addition it is possible, as shown in FIG. 8c, to connect the capacitors $C_1$ to $C_3$ in a parallel circuit by targetedly severing the connecting tracks. That affords a resonance circuit 83 in which the sum of the partial capacitors $C_1$ to $C_3$ is disposed in opposite relationship to the inductance L of the RF antenna coil 81.

As can be seen therefrom a plurality of different capacitance values can be achieved afterwards by targetedly severing the connecting tracks so that a personalised, unique frequency can be afterwards encoded in the security element 8. The operation of severing the connecting paths is effected here for example by means of a laser.

Reference will now be made to FIGS. 9a to 9d to discuss further possible options in regard to the configuration of a security element for RF identification according to the invention.

Figure 9A:
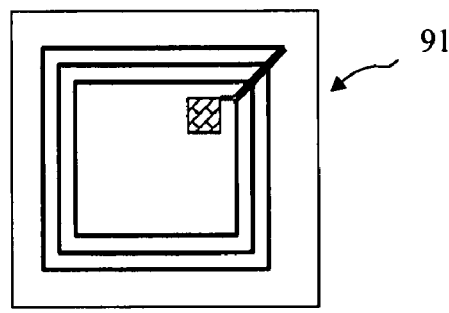

FIG. 9a shows a security element 91. That security element has an inductance and a capacitance which are connected to form a resonance circuit. A microchip is not provided here. Such a security element serves for example as an anti-theft means and reacts to a quite specific carrier frequency.

Figure 9B:
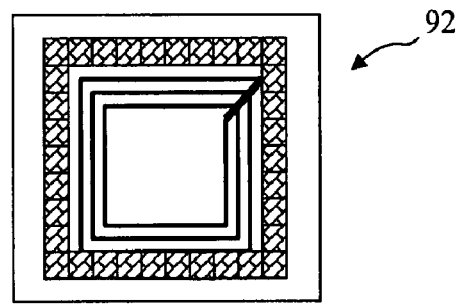

FIG. 9b shows a security element 92 which has an inductance and a capacitance. The capacitance can be individualised by means of the process described with reference to FIG. 8a so that this security element responds to a given, personalised frequency. Such a security element can be used for example for identification and authentication.

Figure 9C:
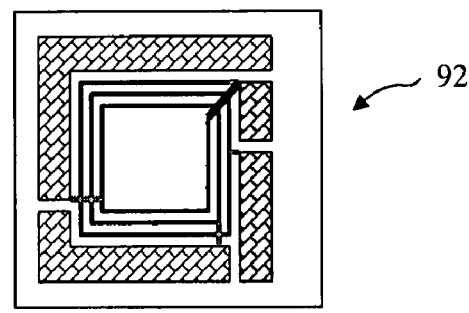

FIG. 9c shows a security element 92 in which a coil is connected to various capacitances in such a way that various resonance circuits are afforded and the circuitry accordingly has two or more resonance frequencies. Subsequent removal of individual connecting tracks makes it possible to encode items of information by determining the resonance frequencies which that circuit has. Thus for example when using eight different resonance frequencies $2^8-1$ encoding options are possible. Such a security element can be used for identification and authentication purposes.

Figure 9D:
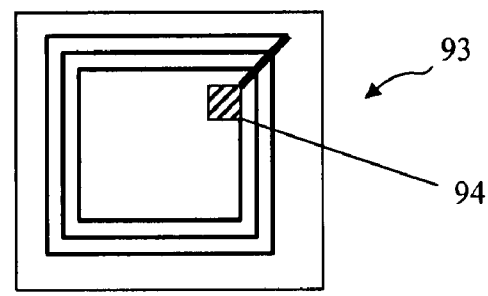

FIG. 9d shows a security element 93 having an antenna and a microchip 94. The communication between the transponder and the reading device can lie in the communication of a simple ID identification or a process in which data stored in the transponder are identified and stored afresh. Such an element can read and write data and communicate with a reading device so that it is possible here to implement complex functions, in particular complex identification, authentication, e-commerce and e-government functions.

The invention claimed is:

1. A security element for RF identification, wherein the security element has a flexible, electrically non-conducting substrate layer and a first electrically conductive layer of an electrically conducting material which is applied to the substrate layer and which in a first surface region is shaped out in pattern form to form an RF component, wherein a first relief structure with grooves for altering electrical properties of the RF component is shaped at least in region-wise manner in the surface region, associated with the RF component, in the first electrically conductive layer, wherein
the first electrically conductive layer is shaped out in the first surface region in the form of an RF antenna or a coil, that in the region of the conductive layer which is associated with the RF antenna or the coil the grooves of the relief structure are oriented on average more longitudinally relative to the direction of flow of the electric current than transversely with respect to the direction of flow of the electric current, and that the relief structure has a profile depth in the range of 50 nm to 10 μm and a spatial frequency in the range of 100 to 2000 lines per mm, wherein the grooves of the relief structure are provided both in the surface of the first electrically conducting layer, which is towards the substrate layer, and also in the surface of the first electrically conducting layer, which is remote from the substrate layer.

2. A security element according to claim 1, wherein the substrate is a replication layer and the first relief structure is shaped in the surface of the replication layer which is towards the first electrically conductive layer.

3. A security element according to claim 1, wherein the first electrically conductive layer is a metal layer applied to the substrate layer.

4. A security element according to claim 1, wherein the first electrically conductive layer is of a thickness in the range of 50 nm to 50 m, preferably 1 to 10 μm.

5. A security element according to claim 1, wherein the grooves of the relief structure in the region of the electrically conductive layer which is associated with the RF antenna or coil are oriented longitudinally with respect to the direction of flow of the electric current.

6. A security element according to claim 1, wherein the first electrically conductive layer in the first surface region is shaped out in the form of one or more conductor tracks of a width of 50 μm to 10 mm, preferably 100 μm.

7. A security element according to claim 1, wherein the security element has a second electrically conductive layer and that the first and the second electrically conductive layers form a capacitive element in the first surface region.

8. A security element according to claim 7, wherein a second relief structure is shaped at least in region-wise manner in the surface region associated with the capacitive element in the second conductive layer.

9. A security element according to claim 7, wherein in that the first relief structure has a plurality of mutually crossing grooves.

10. A security element according to claim 1, wherein the first relief structure is of a sawtooth, triangular, rectangular or sine profile.

11. An optical security element according to claim 1, wherein the first relief structure is formed from the superimposition of a coarse structure and a fine structure.

12. A security element according to claim 1, wherein the first relief structure additionally produces an optical security feature.

13. A security element according to claim 1, wherein the security element has a resonance circuit for RF identification.

14. A security element according to claim 1, wherein the security element has a chip.

15. A security element according to claim 1, wherein the security element is a film element, in particular a stamping film, a laminating film, a sticker film or a partial element of a transfer layer portion of such a film.

16. A process for the production of a security element for RF identification, wherein in the process a first conductive layer of an electrically conducting material shaped out in pattern form to form an RF component is applied to a flexible, electrically non-conducting substrate layer in a first surface region of the substrate layer, wherein a first relief structure with grooves for altering electrical properties of the RF component is shaped at least in region-wise manner in the surface region associated with the RF component in the first conductive layer, wherein in the first surface region the first electrically conductive layer is shaped out in the form of an RF antenna or a coil, wherein in the region of the conductive layer which is associated with the RF antenna or the coil the grooves of the relief structure are oriented on average more longitudinally relative to the direction of flow of the electric current than transversely with respect to the direction of flow of the electric current, and wherein the relief structure has a profile depth in the range of 50 nm to 10 μm and a spatial frequency in the range of 100 to 2000 lines per mm, wherein the grooves of the relief structure are provided both in the surface of the first electrically conducting layer, which is towards the substrate layer, and also in the surface of the first electrically conducting layer, which is remote from the substrate layer.

17. A process according to claim 16, wherein the first conductive layer is applied to the substrate layer over the full surface area, for example by vapour deposition, and then partially demetallised in pattern form to form the RF component.

18. A process according to claim 16, wherein two or more capacitive partial elements connected with connecting tracks are shaped out in the first conductive layer and that connecting tracks to capacitive partial elements are later severed for fine tuning of the resonance frequency.

* * * * *